(12) United States Patent
Børsting

(10) Patent No.: US 9,293,861 B2
(45) Date of Patent: Mar. 22, 2016

(54) APPARATUS FOR CUTTING OFF FIBRE MATS

(75) Inventor: Dennis André Børsting, Kolding (DK)

(73) Assignee: LM Glasfiber A/S, Kolding (DK)

( * ) Notice: Subject to any disclaimer, the term of this patent is extended or adjusted under 35 U.S.C. 154(b) by 822 days.

(21) Appl. No.: 12/448,915

(22) PCT Filed: Jan. 16, 2008

(86) PCT No.: PCT/DK2008/000014
§ 371 (c)(1),
(2), (4) Date: Oct. 6, 2009

(87) PCT Pub. No.: WO2008/086802
PCT Pub. Date: Jul. 24, 2008

(65) Prior Publication Data
US 2010/0058904 A1    Mar. 11, 2010

(30) Foreign Application Priority Data
Jan. 16, 2007   (DK) .................................. 2007 00058

(51) Int. Cl.
| B26D 7/02 | (2006.01) |
| H01R 13/633 | (2006.01) |
| B23D 45/00 | (2006.01) |
| B24B 19/22 | (2006.01) |
| B29C 70/54 | (2006.01) |

(52) U.S. Cl.
CPC ............ *H01R 13/633* (2013.01); *B23D 45/003* (2013.01); *B24B 19/223* (2013.01); *B29C 70/545* (2013.01); *Y10T 83/04* (2015.04); *Y10T 83/4561* (2015.04); *Y10T 83/7493* (2015.04)

(58) Field of Classification Search
CPC . Y10T 83/7493; Y10T 83/04; Y10T 83/4561; Y10T 83/323; Y10T 83/7507
USPC ...................... 83/17, 18, 175, 176, 20, 466.1, 83/648–650, 949, 951, 614
See application file for complete search history.

(56) References Cited

U.S. PATENT DOCUMENTS

| 2,293,721 A * | 8/1942 | Engler .............................. 83/20 |
| 2,642,938 A * | 6/1953 | Hallden ........................ 83/305 |
| 3,099,181 A * | 7/1963 | Hergenhan ..................... 83/349 |
| 3,121,253 A | 2/1964 | Varrial |

(Continued)

FOREIGN PATENT DOCUMENTS

| DE | 4240933 A1 | 6/1994 |
| EP | 0032383 A1 | 7/1981 |

(Continued)

*Primary Examiner* — Laura M Lee
(74) *Attorney, Agent, or Firm* — Nath, Goldberg & Meyer; Jerald L. Meyer; Tanya E. Harkins

(57) ABSTRACT

The present subject matter concerns a method and an apparatus for cutting fiber mats where the cutting is effected with a mechanical automatic tool, where cutting of the fiber mat is effected so that the cut surface on the fiber mat can be varied from an angle greater than 0° to an angle less than 180° in relation to both surfaces on the fiber mat, where it is the variable position of the fiber mat relative to the direction of movement and cutting of the cutting tool that determines the angle of the cut. A fiber mat may be cut with a cut which is particularly adapted to the specific piece of fiber mat which is cut. It is thus possible to have a production where various requirements to cut faces in the fiber mats can be met.

9 Claims, 6 Drawing Sheets

(56) References Cited

U.S. PATENT DOCUMENTS

| | | | |
|---|---|---|---|
| 3,542,267 A * | 11/1970 | Saburo et al. | 225/3 |
| 3,658,614 A * | 4/1972 | Beck | 156/187 |
| 4,108,711 A * | 8/1978 | Hoffmann | 156/497 |
| 4,397,203 A * | 8/1983 | Brack et al. | 83/156 |
| 4,922,774 A * | 5/1990 | Oldeman | 83/175 |
| 4,926,725 A * | 5/1990 | Helgesson | 83/155 |
| 4,954,202 A | 9/1990 | Price et al. | |
| 4,989,372 A | 2/1991 | Avila et al. | |
| 5,033,341 A * | 7/1991 | Mussig et al. | 83/18 |
| 5,299,513 A * | 4/1994 | Kambara et al. | 112/470.31 |
| 5,377,570 A * | 1/1995 | Giljam | 83/175 |
| 5,727,723 A | 3/1998 | Cree | |
| 5,865,003 A * | 2/1999 | Klett et al. | 52/518 |
| 6,164,176 A * | 12/2000 | Larsson | 83/435.12 |
| 6,176,164 B1 * | 1/2001 | Nylander | 83/21 |
| 6,302,602 B1 * | 10/2001 | Kiyohara et al. | 400/593 |
| 7,117,776 B1 * | 10/2006 | Grafe et al. | 83/287 |
| 7,406,901 B2 * | 8/2008 | Schmidt et al. | 83/177 |
| 2004/0021247 A1 | 2/2004 | Habisreitinger et al. | |
| 2005/0183559 A1 * | 8/2005 | Rue | 83/574 |
| 2006/0015598 A1 | 1/2006 | Olsen et al. | |
| 2006/0137500 A1 * | 6/2006 | Downing | 83/56 |
| 2008/0193709 A1 * | 8/2008 | Han | 428/100 |

FOREIGN PATENT DOCUMENTS

| | | |
|---|---|---|
| FR | 2624049 A1 | 6/1989 |
| FR | 2689436 A1 | 10/1993 |
| WO | 2006015598 A1 | 2/2006 |

\* cited by examiner

APPARATUS FOR CUTTING OFF FIBRE MATS

This is an National Phase Application filed under 35 U.S.C. 371 as a national stage of PCT/DK2008/000014, filed on Jan. 16, 2008, an application claiming the benefit of Danish Patent Application No. PA 2007 00058, filed on Jan. 16, 2007, the entire content of each of which is hereby incorporated by reference in its entirety.

FIELD OF THE INVENTION

The present invention concerns a method and an apparatus for cutting fibre mats, preferably from a roll, where the cutting is effected by a mechanical automatic tool.

DESCRIPTION OF PRIOR ART

It is commonly known that e.g. glass fibre mats used in connection with moulding fibre-reinforced plastic items are cut to size so that the fibre mats are individually adapted to their application. From the production of wings for modern wind powerplants it is known to perform these so-called stepwise reductions in the lay-up for the wings. Typically, identical thickness is not required along the entire circumference in the wing laminate as well as in longitudinal direction of the wing.

From the industry apparatuses used for laying fibre mats, e.g. glass fibre mats in moulds for wind turbine wings, are known. These apparatuses typically carries a roll with one long fibre mat which in connection with the laying in the mould is cut off at the desired length. The mats are thus cut on site and exactly to the particular position in the mould. These machines are typically provided with an automatic and mechanical cutting tool which includes a cutter disc of suitable kind, preferably an edged cutter disc, so that a kind of shearing action is achieved in the cutting process.

If the particular layers are reduced stepwise so that the individual layers are cut perpendicularly to the surface, some inexpediencies arise in highly loaded items. In WO 2006/015598 there is indicated a solution to these problems, where the cuts performed in respective fibre mats are performed as an inclined cut through the thickness of the fibre mat. In this way is achieved a much better transmission of the forces acting on the fibre-reinforced laminate, and the risk of delamination in the stepped area is largely eliminated.

The closest prior art and method for cutting the fibre mats is indicated in WO 2006/015598 and constitutes a nail cutter or cutting methods taken from the floor carpet industry. These methods can perform the desired operation, but in order to attain a process speed suited for a modern production firm, it is necessary with a specially adapted and industrialised solution.

It is the purpose of the invention to indicate an apparatus that may rapidly, simply and cheaply perform the wanted cutting of the fibre mats so that the thickness of the ends along a certain length is reduced stepwise to zero, where the apparatus may readily be changed to traditional perpendicular cutting. Furthermore, it is the purpose to indicate an apparatus where the cutting is effected precisely and without substantial waste.

DESCRIPTION OF THE INVENTION

As mentioned, the invention concerns a method as well as an apparatus for cutting fibre mats, where the cutting of the fibre mat is effected so that the cut surface on the fibre mat can be varied from an angle greater than 0° to an angle less than 180° in relation to both surfaces on the fibre mat, where it is the variable position of the fibre mat relative to the direction of movement and cutting of the cutting tool that determines the angle of the cut.

By a method or an apparatus according to the above, there is achieved the advantage that a fibre mat may be cut with a cut which is particularly adapted to the specific piece of fibre mat which is cut. It is thus possible to have a production where various requirements to cut faces in the fibre mats can be met. For example, in one item there may be constituent fibre mats extending from one end of a mould to the other end, where the fibre mats are desired cut from a roll with a cut which is perpendicular to the surface of the fibre mat, while other fibre mats are wanted to be cut at one end or both with a stepwise reduction to a thickness of 0 mm along 30 mm in longitudinal direction of the fibre mat.

With the possibility of varying the setting of the cutting angle on the apparatus, there is achieved great flexibility, where different cutting angles can be applied during cutting of fibre mats so that specific fibre mat designs can be made with optimal build-ups.

One variant of the method according to the invention includes at least includes steps where a fibre mat is passed in between a first set of fixing means and onwards between a second set of fixing means, preferably one or more fixing beams disposed in immediate vicinity of at least one cutting tool, where the cutting tool is activated after fixing the fibre mat. By this fixation, there is achieved possibility of securing the fibre mat so that it is stretched and thus may be cut more easily at the desired angle, and not the least with the desired quality on the cut face.

The fixing means may advantageously consist of fixed or movable fixing beams, and in a preferred variant the fixing itself is performed with "fire hoses" which by filling with compressed air or similar press against a fixing beam. The fire hoses may also advantageously be fitted on beams extending across part of or the entire width of the fibre mat. Thus is achieved a simple and reliable securing of the fibre mat during the cutting. After ending the cutting, the fixing means are loosened by the pressure being relieved in the "fire hoses", whereby the pressure against the fixing beams disappears. "The fire hoses" are in principle hoses made of a material which is movable—e.g. a fire hose—and which are closed at the ends, e.g. by squeezing the ends between to pieces of steel. The hose is furthermore provided with a connection for compressed air or similar. The use of "fire hoses" is commonly known and has been used in the industry for many years.

In a variant of the invention, fixing the fibre mat may include that the fibre mat is tensioned between the fixing means in order thereby to position the fibre mat before cutting. Such a further positioning of the fibre mat may be effected by activating at least one pressing beam acting on the angle of the fibre mat relative to the cutting tool, preferably for contact with an abutment, whereby the position of the fibre mat in relation to a cutting tool assumes a predetermined angle. Typically, the fibre mat is disposed between two fixing tools, here forming a straight line between the latter. Then the fibre mat is acted on by a so-called pressing beam, now no longer assuming a straight line but an angular shape. How much the pressing beam presses on the fibre mat can be regulated according to which angle at which the fibre mat is wanted to be cut. At the extreme position of the pressing beam, the fibre mat may advantageously be in contact with a fixed abutment so that cutting at a very acute angle may be effected with a proper and firm support of the fibre mat.

In order for this tensioning and positioning may occur, it is necessary that more fibre mat can be supplied, as this does not necessarily have an elasticity which is large enough to be moved into the wanted position. Here again it is an advantage with fire hoses in connection with the fixing means, as these may be activated at a lower pressure so that the fibre mat can be drawn through the fixing means irrespectively whether the means are activated or not. When the fibre mat has reached its final position, the pressure in the fire hose is increased, and the fixation is definitive.

The method for cutting fibre mats according to the invention may advantageously be used for fibre mats that mainly contain glass fibres, carbon fibres, plastic fibres or vegetable fibres. The method is also suited for use in connection with cutting fibre mats that are made of more than one type of fibres, e.g. fibre mats made with an amount of glass fibres and an amount of carbon fibres.

An apparatus according to the invention may be with a cutting tool, where cutting is effected by moving the tool transversely of the width of the fibre mat. So the fibre mat may be positioned and fixed and cutting may be performed with a rotating cutting tool. In a preferred variant of the apparatus, the fibre mat is fixed against a beam which is disposed in immediate vicinity of the cutting tool, whereby there is achieved the advantage that the fibre mat is secured at the point of cutting.

The cutting tool may advantageously be a diamond cutter disc. For example, a rather common cutter disc of the type used in handheld angle grinders for cutting in ceramic tiles, roof tiles or paving stones. Such a cutter disc can be cheaply bought in almost all DIY centres and tool stores, and by using common cutting tools there is achieved the great advantage that spare parts are much easier to procure than if specially made cutter discs were used.

In a preferred variant of an apparatus according to the invention, the apparatus is with a first individual cutting tool and with a second individual cutting tool. By this variant it is possible to perform two cuttings simultaneously, whereby the speed may be increased in some cases. The two cuttings occurring at the same time are cutting at the last end of a specific fibre mat and cutting of the first end of the next specific fibre mat.

A particularly preferred variant of the apparatus according to the invention is adapted to perform various combinations of cuts with the two individual cutting tools, wherein
 a. the first cut is effected at a first angle relative to the surface and the second cut is effected at a corresponding first angle relative to the surface;
 b. the first cut is effected at a first angle relative to the surface and the second cut is effected at a second angle relative to the surface.

The first angle may e.g. be perpendicular to the surface of the fibre mat, while the second angle e.g. may be 150° relative to the surface of the fibre mat. The specific fibre mat may thus be provided with a final cut face with an acute angle, while the next specific fibre mat is provided with a cut face which is perpendicular to the surface.

SHORT DESCRIPTION OF THE DRAWING

The invention is described in more detail with reference to the drawing, where:

FIG. 1 shows an apparatus where the fibre mat is passed through.

DETAILED DESCRIPTION OF THE INVENTION

Figure 1:
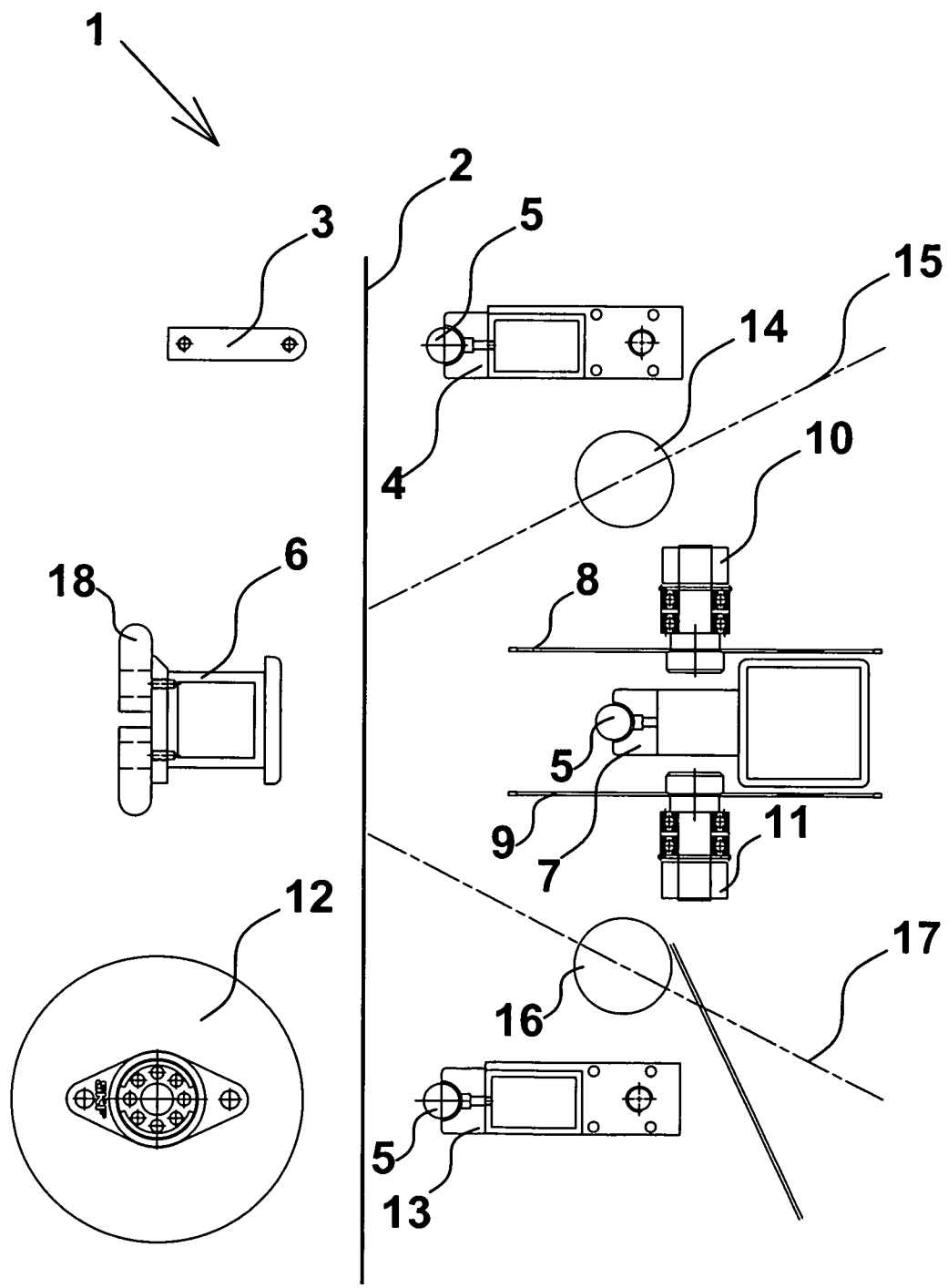

In FIGS. 1-5, the same variant of an apparatus according of the invention is shown, where the apparatus is represented in different positions. FIG. 1 shows an apparatus 1 where a fibre mat 2 is passed through the apparatus 1 without cutting. At the top, at first is seen fixing means 3, 4, 5 consisting of a fixing beam 3 and a fixed beam 4 with fire hose 5. At the middle appears a second fixing beam 6 that interacts with a fixed beam 7, on which two individual cutting tools 8, 9 are mounted, driven by electric motors 10, 11. The beam 7 is also equipped with a fire hose 5. At the bottom appears a further set of fixing means consisting of a fixing beam 12, here designed as a roller that may be locked against rotation, and a fixed beam 13 with fire hose 5. Between the fixed beams 4 and 7 there is arranged a pressing beam 14 which can be moved along the axis 15 and which may be used for positioning the fibre mat 2. Also, between the beams 7 and 13 there appears a pressing beam 16 which can be moved along the axis 17. The pressing beam 16 is used in the same way as the pressing beam 14 for positioning the fibre mat 2.

Figure 2:
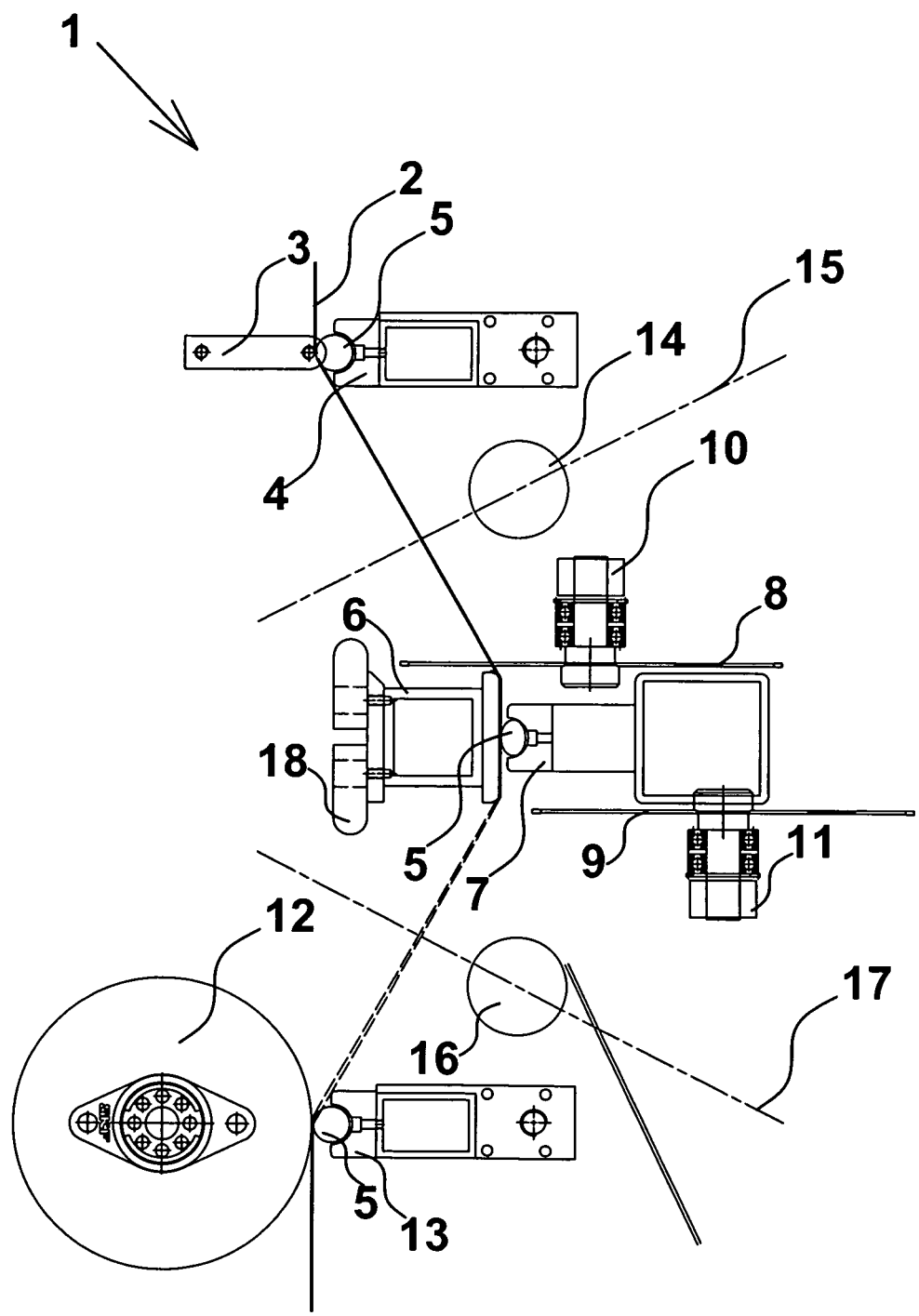
FIG. 2 shows an apparatus where the fibre mat is cut at a first cutting angle.

In FIG. 2 appears the fibre mat 2 fixed between the fixing beam 3 and the fixed beam 4. The fixing is effected partly by moving the fixing beam 3 and partly by supplying compressed air to the fire hose 5. Furthermore, the fibre mat 2 may be fixed with the second fixing beam 6 that presses the fibre mat 2 against the fixed beam 7, where a second fire hose 5 is used for fixing. Then the electric motor 10 activated and thereby the cutting tool 8 which is moved crosswise of the fibre mat 2 along the beams 6 and 7. In the illustrated setup the motor 11 with the cutting tool 9 is shown in a refracted position.

Figure 3:
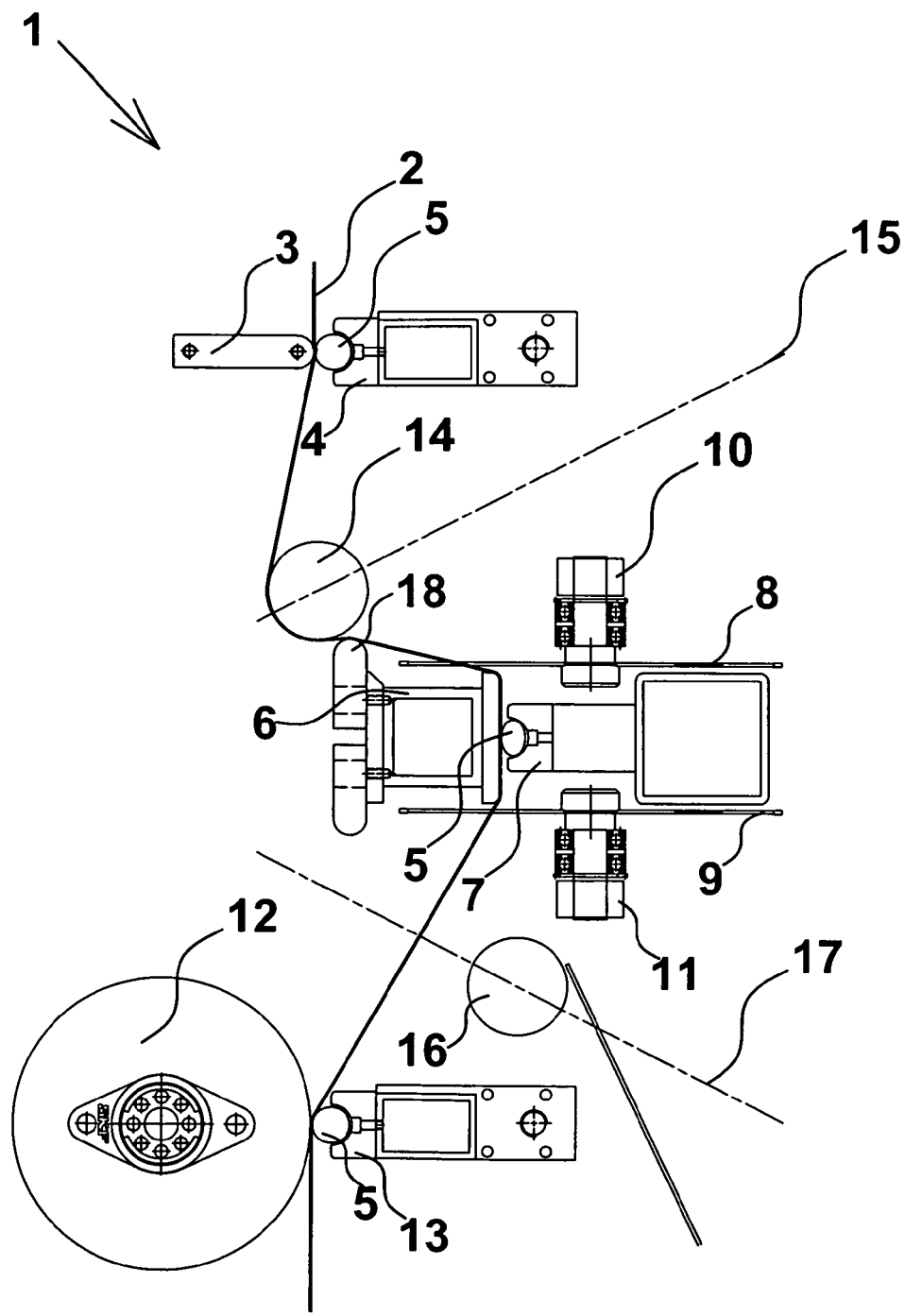
FIGS. 3-5 show an apparatus where two cuts are made in the fibre mat.

In FIG. 3, the pressing beam 14 appears in activated position, where it has been moved along the axis 15 and against the fibre mat 2. By this movement, the fibre mat 2 is pressed against a fixed abutment 18 on the fixing beam 6. In that way, the fibre mat 2 is clamped tightly between the edge of the fixing beam and the fixed abutment 18 and may in this fixation be cut at a very acute angle. Also, the fibre mat 2 is shown in a fixed position between the beams 12 and 13 and between the beams 6 and 7, where the cut is performed at a much smaller angle.

Figure 4:
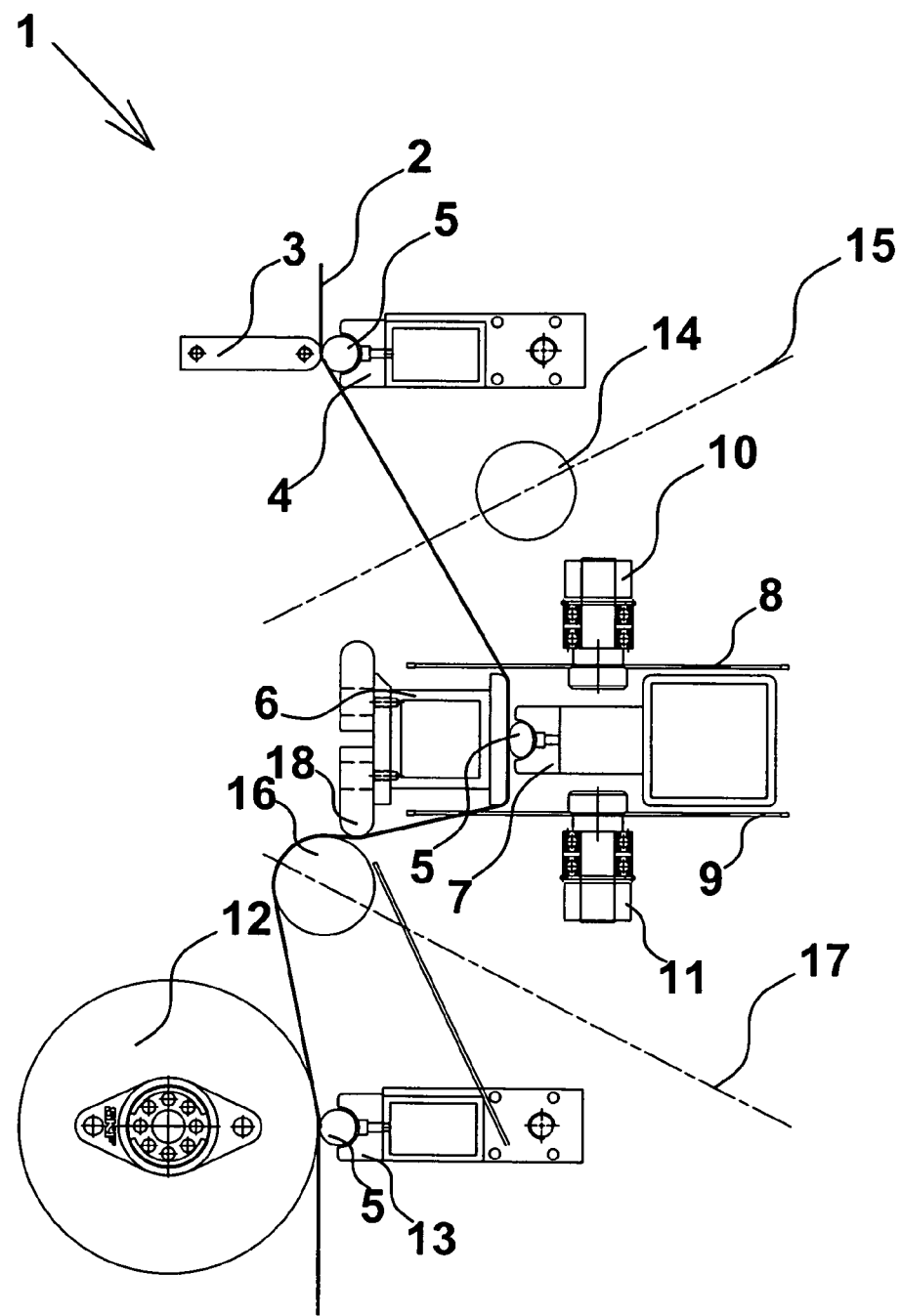

In FIG. 4 appears yet a variant of the setting options for the apparatus, where the cutting tool 8 performs a cut at a small angle, and where the cutting tool 9 performs a cut at a large angle. By varying between performing a given cut angle with one cutting tool 8 and the other cutting tool 9, the cuts are made at each their side of the fibre mat 2, which may be advantageous in the construction of the fibre composite item in which the fibre mats 2 are to be applied.

Figure 5:
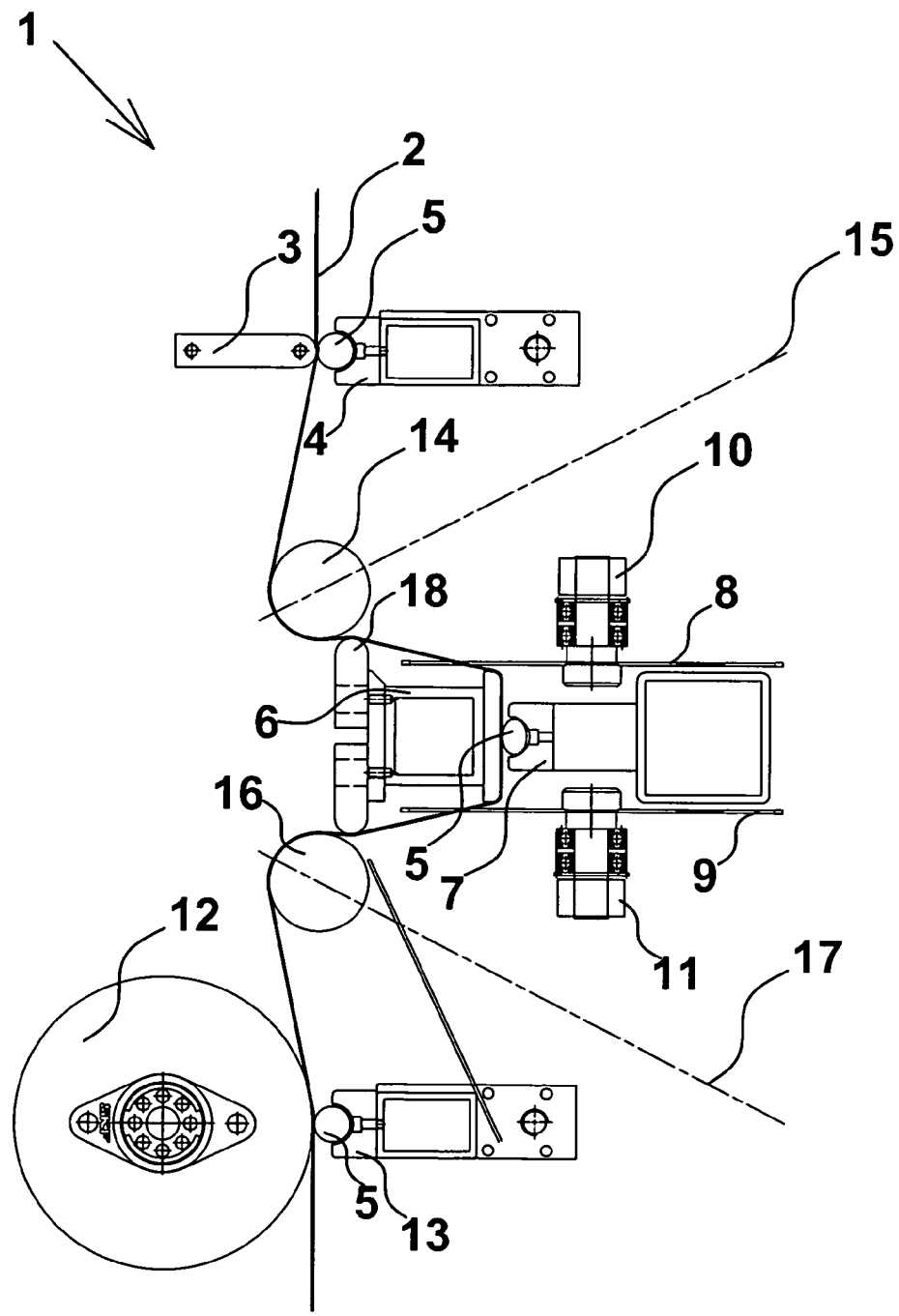
Figure 6A:
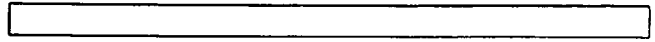
FIG. 6 shows different variations in cut faces.
Figure 6B:
Figure 6C:
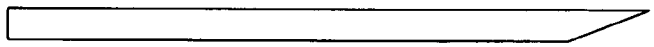
Figure 6D:
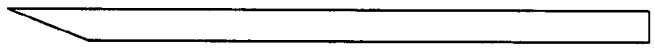
Figure 6E:
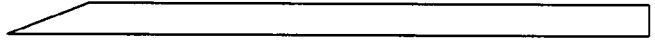
Figure 6F:
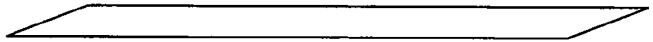
Figure 6G:
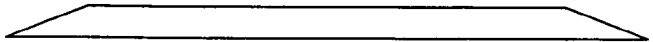
Figure 6H:
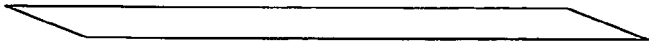
Figure 6I:

In FIG. 5, the apparatus is set for two cuts, where the cutting angles at both cuts are at a small angle. The part of the fibre mat 2 appearing between the two cutting tools 8 and 9 is waste that is left after finishing the cutting and which by loosening the fixing beam 6, 7 falls down into a not shown waste magazine. Only when both cutting tools 8 and 9 are used simultaneously there will be a narrow strip of fibre mat 2 which becomes waste.

In FIG. 6 is shown different variations of cuts which can be performed with the apparatus. The shown cut variations are shown schematically, and the Figure only serves to help understanding the setting options. As mentioned in the description, the angle of the cuts may be varied between an angle greater than 0° to an angle less than 180° relative to both surfaces on the fibre mat.

The invention claimed is:

1. A method for cutting fibre mats with a mechanical automatic tool, the mechanical automatic tool comprising a first set of fixing means, a second set of fixing means, at least one pressing beam and a cutting tool, the method comprising:

securing the fibre mat onto the mechanical automatic tool using the first set and second set of fixing means to generate a first linear position of the fibre mat such that the fibre mat assumes a linear shape, activating the at least one pressing beam to position the fibre mat into a second angular position such that the fibre mat is at a pre-determined angle with respect to the cutting tool, the predetermined angle is between an angle greater than 0° and an angle less than 180°, the at least one pressing beam positioned between the first set of fixing means and the cutting tool, the pressing beam movable linearly along a first axis, the first axis positioned at an angle with respect to the first set of fixing means, wherein the second angular position of the fibre mat is set on the mechanical automatic tool by adjusting the position of the pressing beam, and wherein the predetermined angle of the fibre mat relative to the direction of movement and cutting of the cutting tool determines the angle of the cut, and effecting cutting of the fibre mat by linearly moving the cutting tool transversely of the width of the fibre mat.

2. Method for cutting fibre mats according to claim 1, further comprising:

passing the fibre mat between the first set of fixing means and onwards between the second set of fixing means; and activating the cutting tool after fixing the fibre mat.

3. Method for cutting fibre mats according to claim 1, further comprising positioning the fibre mat by activating at least one pressing beam acting on the angle of the fibre mat relative to the cutting tool for contact with an abutment, whereby the position of the fibre mat in relation to the cutting tool assumes a predetermined angle.

4. Method for cutting fibre mats according to claim 1, characterized in that the fibre mat mainly contains glass fibres.

5. Method for cutting fibre mats according to claim 1, characterised in that the fibre mat contains two or more different types of fibres.

6. A method for cutting fibre mats with a mechanical automatic tool, the mechanical automatic tool comprising a first set of fixing means, a second set of fixing means, a third set of fixing means, a first cutting tool, a second cutting tool, a first pressing beam and a second pressing beam, the method comprising:

securing the fibre mat onto the mechanical automatic tool using the first set and second set of fixing means to generate a first position of the fibre mat such that the fibre mat assumes a linear shape, activating the first pressing beam, and optionally the second pressing beam to position the fibre mat into a second angular position such that the fibre mat is at a first and an optional second pre-determined angle with respect to the first and the second cutting tools respectively, the first and the optional second predetermined angle are between an angle greater than 0° and an angle less than 180°, the first pressing beam positioned between the first set of fixing means and the first cutting tool, the second pressing beam positioned between the third set of fixing means and the second cutting tool, the first and second pressing beams movable linearly along a first and a second axis respectively, and the first and second axis positioned at an angle with respect to the first and second set of fixing means respectively, wherein the first and second pressing beams are adjustable along the first and second axes to position the fibre mat at a plurality of angular positions relative to the respective first and second cutting tools to adjust the angle of the cut, and effecting cutting of the fibre mat at the first and the optional second pre-determined angle by linearly moving the first and second cutting tools transversely of the width of the fibre mat.

7. Method for cutting fibre mats according to claim 6, further comprising:

passing the fibre mat between the first set of fixing means and onwards between the second set of fixing means; and activating the cutting tool after fixing the fibre mat.

8. Method for cutting fibre mats according to claim 6, characterized in that the fibre mat mainly contains glass fibres.

9. Method for cutting fibre mats according to claim 6, characterised in that the fibre mat contains two or more different types of fibres.

* * * * *